Jan. 24, 1928.　　　　　　　　　　　　　　　　　　　　1,656,995
R. WENZEL
RAILROAD TRUCK WITH FIVE OR MORE AXLES
Filed Feb. 16, 1927
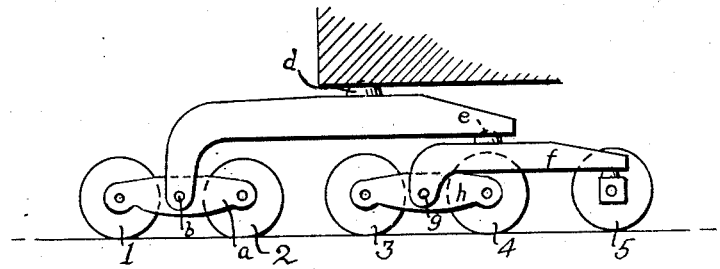
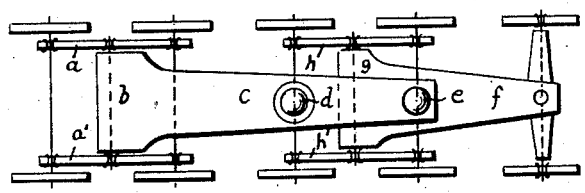
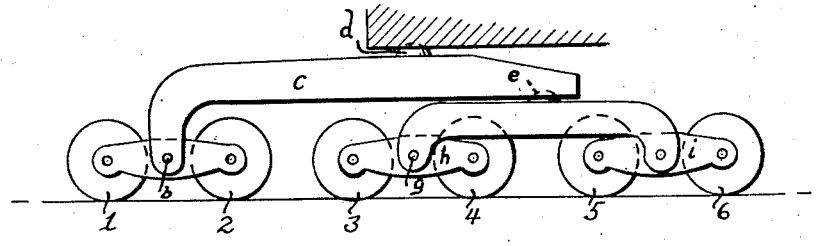
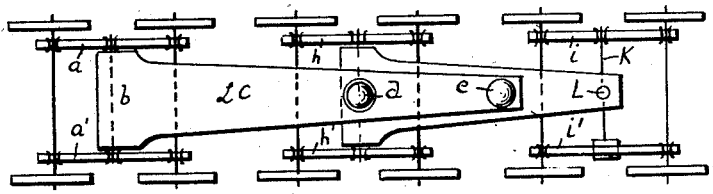
INVENTOR.
R. Wenzel
BY Marks & Clerk
ATTORNEYS.

Patented Jan. 24, 1928.

1,656,995

UNITED STATES PATENT OFFICE.

REINHOLD WENZEL, OF LUEBECK, GERMANY, ASSIGNOR TO LUEBECKER MASCHINEN-BAU-GESELLSCHAFT, OF LUEBECK, GERMANY.

RAILROAD TRUCK WITH FIVE OR MORE AXLES.

Application filed February 16, 1927, Serial No. 168,716, and in Germany February 27, 1926.

Monorail trucks are known where the wheels are connected by equalizers and further two-rail trucks with four wheels where the frame connecting the axles is supported on two points of one axle and on one point of the other, so as to ensure an equal distribution of the load.

My invention ensures this distribution of the load over all wheels of ten or more wheeled trucks by having every two wheels connected by equalizers, while the support between these equalizers and the car body is made on three points. Owing to this three-point support, the axles will adapt themselves individually to curves and to any roughness of the track, one axle independent of the other, without jamming in any way.

Moreover there is no more risk of derailing on account of the fact that each wheel will immediately follow any roughness that may turn up in the track.

The details of my invention will appear as the description proceeds with reference to the embodiment illustrated, by way of example, in the appended drawing, wherein Fig. 1 is a view of a truck with five axles in side elevation and Fig. 2 is a view of the same in plan. Axles 1 and 2, as well as axles 3 and 4 are guided in a similar manner as are four-wheeled trucks or bogies, the axles being connected by equalizers $a$, $a^1$ and $h$, $h^1$. The frame with axles 3 and 4 is in communication with axle 5 by lever $f$ which gives a three-point support; the frame with the axles 1 and 2 is connected to lever $f$ by lever $c$ at point $e$, said lever $c$ forming a three-point support. Levers $c$ and $f$ are provided with pivots $b$ and $g$ respectively, on which the equalizers are guided. Fig. 3 shows a truck with 6 axles in side elevation and Fig. 4 the same in plan. In this design axles 5 and 6 are connected by equalizers $i$, $i^1$, which are guided in a cross beam $k$. Lever $f$ in these designs of example is connected to the equalizers of the center truck by pivots $g$ and is supported by a spherical bearing $l$ in the crossbeam $k$. The other details are the same as specified above for trucks shown in Figures 1 and 2. In both designs referred to, the car body rests on levers $c$ by means of an articulated joint at point $d$.

The number of axles can be conveniently increased, either by adding individual axles or several axles connected by equalizers and further by levers acting as three-point supports.

I claim as my invention:

A two-rail truck with five or more axles for excavators, delivery spreaders, overburden conveyors, and similar heavy vehicles having five or more axles, in which three-point supports are provided above moveable equalizers.

In testimony whereof I affix my signature.

REINHOLD WENZEL.